May 19, 1964 A. L. NELSON 3,133,747
SEAT RECIPROCATING MECHANISM FOR BICYCLES
Filed July 16, 1962 2 Sheets-Sheet 2

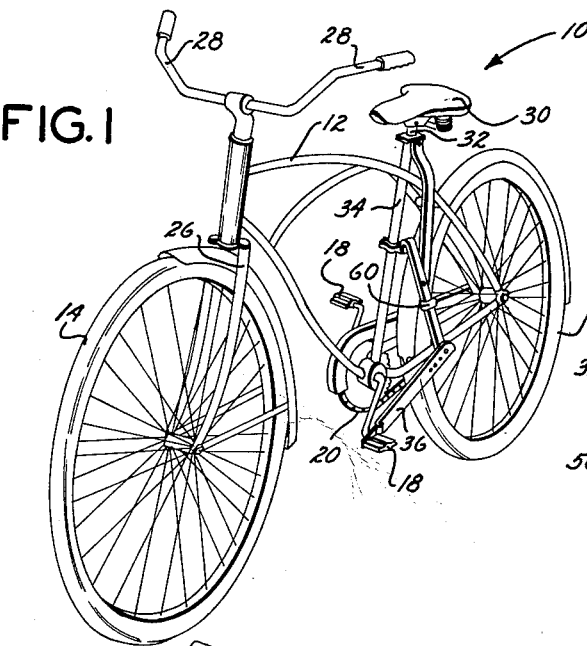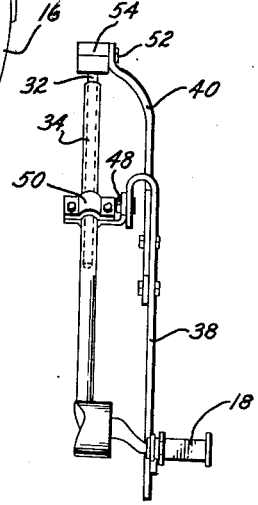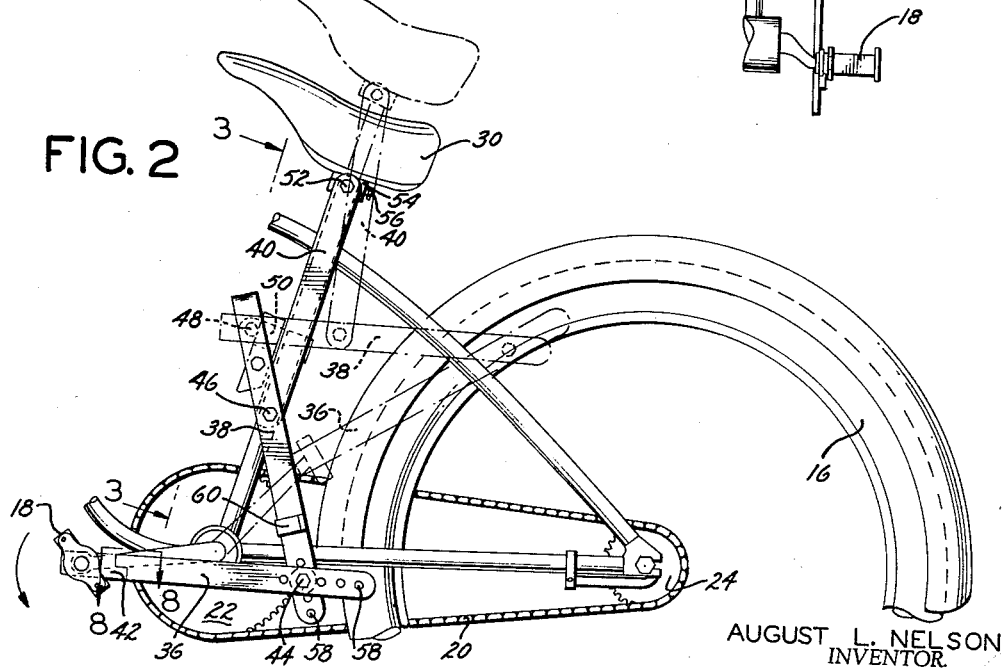

AUGUST L. NELSON
*INVENTOR*

BY
*Bernard I. Brown*
ATTORNEY

United States Patent Office 3,133,747
Patented May 19, 1964

3,133,747
SEAT RECIPROCATING MECHANISM FOR BICYCLES
August L. Nelson, 2916 Mesa Drive, West Covina, Calif.
Filed July 16, 1962, Ser. No. 209,948
9 Claims. (Cl. 280—226)

The present invention relates generally to bicycles; more particularly, the invention relates to bicycles having seat reciprocating mechanisms.

The invention provides a mechanism for cooperation with a bicycle to simulate the rising and falling motion of a rider on a horse during operation of the bicycle. The mechanism simulates to a rider the motion of a horse being ridden, and serves to enhance the enjoyment and excitement of children in such activities as games of cowboys and Indians. A device of the general class of the present invention is disclosed and claimed in United States Patent No. 3,025,080 to August L. Nelson.

It is an object of the present invention to provide a bicycle seat reciprocating mechanism for simulating to a rider the movement of a horse being ridden.

An object of this invention is the provision of a bicycle seat reciprocating mechanism of simple and economical construction.

An object of the present invention is the provision of a seat reciprocating mechanism for a bicycle which requires no special skill or aptitude for installation.

An object of the invention is to provide a bicycle seat reciprocating mechanism which is readily engageable for operation and which is readily disengageable to be rendered inoperative.

Another object of the invention is the provision of a bicycle seat reciprocating mechanism which may be provided as an attachment for a bicycle or as integral original bicycle equipment.

Other objects, features and advantages of the present invention will become apparent to those versed in the art from a consideration of the following description, the appended claims and the accompanying drawings, wherein:

FIGURE 1 is a perspective view of a bicycle whereon a seat reciprocating mechanism of the invention is installed;

FIGURE 2 is a partial elevational view of the bicycle and reciprocating mechanism of FIGURE 1, showing a mechanism according to the invention in one position of operation in solid lines, and showing the mechanism in another position during operation in phantom outline;

FIGURE 3 is a fragmentary view taken at line 3—3 of FIGURE 2;

Figure 4:
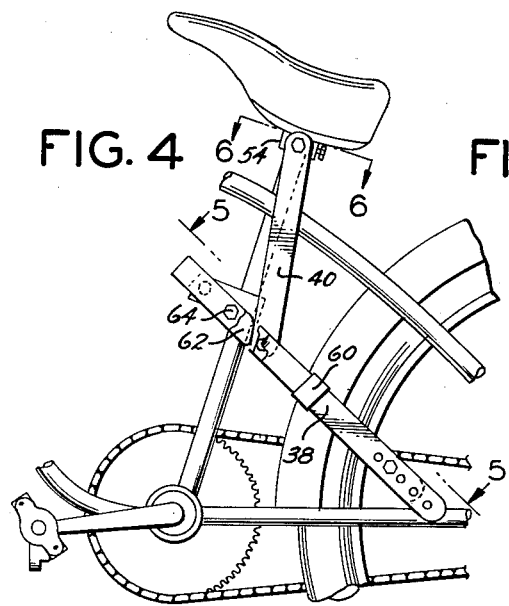
FIGURE 4 is a partial elevational view, similar to the view of FIGURE 2, showing the seat reciprocating mechanism of FIGURES 1 and 2 secured in inoperative position.
Figure 6:
FIGURE 6 is a sectional view taken at line 6—6 of FIGURE 4, showing details of a mounting block utilized with the illustrated embodiment of the invention.

Referring to the drawings, and particularly to FIGURES 1 and 2, a preferred embodiment of the bicycle seat reciprocating mechanism of the invention is shown in operative association with a conventional bicycle 10 having a frame 12, a front wheel 14, and a rear wheel 16. The bicycle is operated by means of pedals 18 which are interconnected with the rear wheel 16 by a chain drive 20 and cooperating sprockets 22, 24. The bicycle has a front fork 26 which is manually rotatable by handle bars 28. A seat 30 for the rider of the bicycle is positioned on the upper end of a vertically adjustable post 32 which is received within a tubular member 34 of the frame 12. This conventional seat mounting arrangement provides for the adjustment of the seat position to different vertical heights to accommodate the rider of the bicycle. For use with the present invention, the seat 30 is not set or secured in a particular position but is freely reciprocable relative to the tubular member 34.

As best illustrated in FIGURES 2 and 3, the illustrated preferred embodiment of the invention includes an actuating arm or member 36, a lever arm or member 38, and a thrust arm or member 40. The actuating arm includes a connecting link portion 42 pivotally mounted on the stud of pedal 18 and detachably secured to the main portion of the actuator arm by the link pin connection which is shown in detail in FIGURES 8 and 9. The detachable connection is provided for a purpose hereinafter described. Lever arm 38 interconnects and is pivotally connected to the actuating arm and the thrust arm by pivot bolts 44, 46, respectively, as shown. As best shown in FIGURE 3, the end portion of lever arm 38 opposite its connection with actuating arm 36 is U-shaped and is pivotally connected by a pivot bolt 48 to a mounting bracket 50, which is secured or clamped about tubular frame member 34. The thrust arm 40 extends from its pivotal connection 46 with lever arm 38 to a pivotal connection at 52 with a mounting block 54, which is secured to the post 32 by set screws 56.

From the geometric relationships of the actuator, lever, and thrust arms and their pivotal interconnections, it will be understood that, upon the operation of the pedals by a rider of the bicycle, a mechanical action is effected by the mechanism thus provided which raises and lowers the seat 30 and the rider thereon upon each revolution of the pedals. It will be understood that during the upward or rear portion of the revolution of the pedal 18 (FIGURE 2) to which the actuator arm is pivotally connected, the actuator arm exerts upward force at its connection 44 with the lever arm in a manner whereby mechanical advantage or leverage is provided in cooperation with pivotal connections 48 and 46. Considerable mechanical advantage or leverage, exemplarily an advantage of three to one, is achieved in applying upward force through the thrust arm 40 to raise the seat 30. The leverage or mechanical advantage may, of course, be increased by appropriate increase in the length of lever arm 38.

From the foregoing description, and from the drawings, it will be appreciated that during the operation of the pedals 18 by a rider, the seat reciprocating mechanism of the invention effects a relatively slow, smooth rising motion of the seat and a relatively rapid lowering of the seat during each revolution of the pedals 18. This action simulates to the bicycle rider the gait of a horse. It will be appreciated that the overall momentum or inertia of the bicycle and the rider are effective in providing energy and force to effect the raising of the seat and rider, and that the muscular effort of the rider on the pedals 18 provides only a portion of the necessary power for raising the seat. The fall or rapid lowering of the rider during each cycle adds energy or momentum. The momentum of the rotating rear wheel provides additional momentum or energy through the chain drive, when the coaster brake is in gear.

A plurality of pivot bolt holes 58 is provided in both the actuating arm 36 and the lever arm 38 to provide means for adjusting the length of the respective arms to control the distance or height of the rise of the seat 30.

Figure 5:
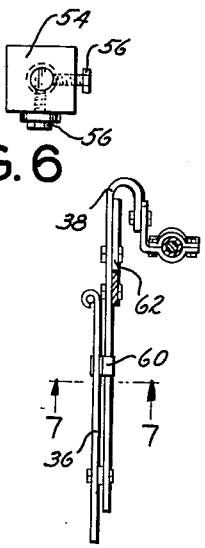
FIGURE 5 is a fragmentary view taken at line 5—5 of FIGURE 4.
Figure 7:
FIGURE 7 is a fragmentary sectional view taken at line 7—7 of FIGURE 5.
Figure 8:
FIGURE 8 is a fragmentary sectional view taken at line 8—8 of FIGURE 2.
Figure 9:
FIGURE 9 is a sectional view taken at line 9—9 of FIGURE 8.

FIGURES 4 and 5 illustrate the manner in which the actuating arm 36 is securable by a spring clip member 60 on lever arm 38 and by a stop member 62 pivoted at 64 on the lever arm, in order to retain the mechanism in inoperative position. To place the mechanism in this inoperative position, the main portion of the lever arm 36 is disengaged from the link portion 42 by disengaging the link pin arrangement (FIGURES 8 and 9). The actuator arm is then engaged in the spring clip on the lever arm in the manner indicated in FIGURES 5 and 7, and stop member 62 is rotated to the position shown in FIGURE 4 wherein it abuts thrust arm 40 to maintain the lever and actuator arms in the position shown.

Figure 12:
FIGURE 12 is a sectional view taken at line 12—12 of FIGURE 11.
Figure 10:
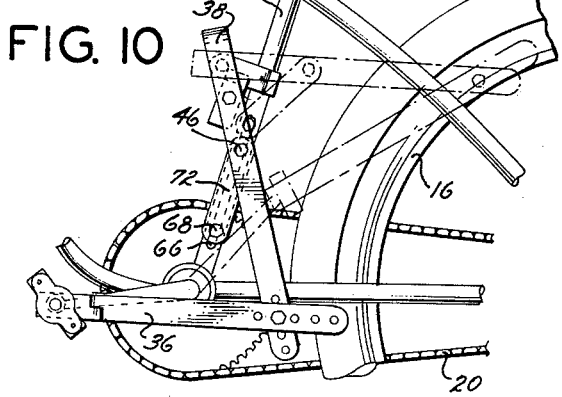
FIGURE 10 is a partial elevational view, similar to the view of FIGURE 4, showing a modified embodiment of seat reciprocating mechanism according to the invention.
Figure 11:
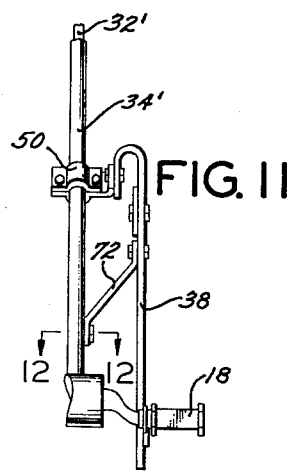
FIGURE 11 is a fragmentary view taken at line 11—11 fo FIGURE 10.

FIGURES 10, 11 and 12 illustrate a modified form of the bicycle seat reciprocating mechanism of the invention. This embodiment is generally similar to the embodiment shown in FIGURES 1 through 8, with respect to the actuating arm 36, the lever arm 38, the mounting bracket 50, and their associated parts and pivotal connections. An elongated opening or slot 66 is provided in a modified tubular member 34'. A pivot bolt 68 extends through the slot and is secured to a modified post 32'. A rotatable sleeve 70 on bolt 68 serves to prevent binding of the bolt and the frame member during relative movement. A link member or thrust arm 72 is pivotally connected to the bolt 68 at one end and is pivotally connected to the lever arm 38 to the pivot bolt 46, as shown. The upward force exerted by the actuating arm 36, and the mechanical advantage or leverage effected by the mechanism of the invention, are exerted through the link member 72 to apply an upward force through the pivot bolt 68 to the post 32' to raise the seat during each revolution of the pedals 18.

It will be readily appreciated that the embodiment of the mechanism of the invention shown in FIGURES 10 to 12 is best adapted for incorporation in new bicycles during their manufacture, whereas the embodiment illustrated in FIGURES 2 through 5 is readily adaptable for mounting on used bicycles as well as on bicycles being produced.

From the foregoing description, those versed in the art will readily appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. In a velocipede having a frame, wheels, foot pedals, and drive means interconnecting the foot pedals and one of said wheels, a seat reciprocating mechanism comprising a seat mounted on a post reciprocable relative to said frame, a thrust arm having its first end portion connected with said post, a lever arm pivoted at its first end portion to the frame and pivotally connected intermediate its ends with the second end portion of the thrust arm, and an actuating arm having its first end portion pivotally connected with the second end portion of the lever arm, said actuating arm having its second end portion pivotally connected with one of said pedals for rotation therewith, whereby the seat is reciprocated upon operation of the velocipede by a rider.

2. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm having its first end portion pivoted to a mounting bracket on the frame, means pivotally connecting the lever arm intermediate its ends with the end of the thrust arm opposite from its said connection with the seat, and an actuating arm having its first end portion pivotally connected with the second end portion of the lever arm, said actuating arm having its second end portion pivotally connected with one of said pedals for rotation therewith, whereby the seat is reciprocated upon operation of the velocipede by the rider.

3. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm pivoted to the frame and pivotally connected intermediate its ends with said thrust arm, and an actuating arm having a link portion and a main portion detachably connected by link means, said actuating arm portions being detachable to render the seat reciprocating mechanism inoperative, said actuating arm link portion being normally pivotally connected for rotation with one of said pedals, said actuating arm main portion being normally pivotally connected to the lever arm, whereby said seat is reciprocated upon operation of the velocipede by a rider.

4. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm pivoted to a mounting bracket on the frame at its first end portion, means pivotally connecting the lever arm intermediate its ends with the end of the thrust arm opposite from its said connection with the seat, and an actuating arm having its first end portion pivotally connected with the second end portion of the lever arm, said actuating arm having its second end portion pivotally connected with one of said pedals for rotation therewith, whereby the seat is reciprocated upon operation of the velocipede by the rider, means for disengaging the actuating arm from the pedal to render the seat reciprocating mechanism inoperative, and clip means on the lever arm for retaining the actuating arm in an inoperative position.

5. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm pivoted at its first end portion to a mounting bracket on the frame, means pivotally connecting the lever arm intermediate its ends with the end of the thrust arm opposite from its said connection with the seat, and an actuator arm having its first end portion pivotally connected with the second end portion of the lever arm, said actuator arm having its second end portion pivotally connected with one of said pedals for rotation therewith, whereby said seat is reciprocated upon operation of the velocipede by a rider, means for disengaging the actuator arm from the pedal to render the seat reciprocating mechanism inoperative, and a stop member pivotally mounted adjacent to the end portion of the lever arm and engageable with the thrust arm to retain the lever arm in an upward inoperative position.

6. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm pivoted at its first end portion to a mounting bracket on the frame, means pivotally connecting the lever arm intermediate its ends with the end of the thrust arm opposite from its said connection with the seat, and an actuator arm having its first end portion pivotally connected with the second end portion of the lever arm, said actuator arm having its second end portion pivotally connected with one of said pedals for rotation therewith, whereby said seat is reciprocated upon operation of the velocipede by a rider, means for disengaging the actuator arm from the pedal to render the seat reciprocating mechanism inoperative, clip means on the lever arm for retaining the actuator arm in an inoperative position, and a stop member pivotally mounted adjacent to the first end portion of the lever arm and engageable with the thrust arm to retain the lever arm in an upward inoperative position.

7. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm pivoted to a mounting bracket on the frame at its first end portion, means pivotally connecting the lever arm intermediate its ends with the end of the thrust arm opposite from its said connection with the seat, and an actuating arm having a link portion and a main portion detachably connected by link means, said actuating arm portions being detachable to render the seat reciprocating mechanism inoperative, said actuating arm link portion being normally pivotally connected for rotation with one of said pedals, said actuating arm main portion being normally pivotally connected to the lever arm, whereby the seat is reciprocated upon operation of the velocipede by the rider, means for disengaging the actuating arm from the pedal to render the seat reciprocating mechanism inoperative, and clip means on the lever arm for retaining the actuating arm in an inoperative position.

8. In a velocipede having a frame, wheels, foot pedals, and drive means interconnecting the foot pedals and one of said wheels, a seat reciprocating mechanism comprising a seat reciprocable relative to the frame, a thrust arm connected with the seat, a lever arm pivoted at its first end portion to a mounting bracket on the frame, means pivotally connecting the lever arm intermediate its ends with the end of the thrust arm opposite from its said connection with the seat, and an actuating arm having a link portion and a main portion detachably connected by link means, said actuating arm portions being detachable to render the seat reciprocating mechanism inoperative, said actuating arm link portion being normally pivotally connected for rotation with one of said pedals, said actuating arm main portion being normally pivotally connected to the lever arm, whereby said seat is reciprocated upon operation of the velocipede by a rider, and a stop member pivotally mounted adjacent to the end portion of the lever arm and engageable with the thrust arm to retain the lever arm in an upward inoperative position.

9. In a velocipede having a frame, wheels, foot pedals, and drive means interconnecting the foot pedals and one of said wheels, a seat reciprocating mechanism comprising a tubular member in said frame and having a slot defined therein, a post reciprocable in the tubular member and having the seat mounted thereon, a thrust arm having its first end portion pivotally connected with the post by pivot means extending through said slot, a lever arm pivoted at its first end portion to the frame and pivotally connected intermediate its ends with the second end portion of the thrust arm, and an actuating arm having its first end portion pivotally connected with the second end portion of the lever arm, said actuating arm having its second end portion pivotally connected with one of said pedals for rotation therewith, whereby the seat is reciprocated upon operation of the velocipede by a rider.

References Cited in the file of this patent

UNITED STATES PATENTS

| | | |
|---|---|---|
| 642,758 | Runge | Feb. 6, 1900 |
| 1,003,359 | Hirmer | Sept. 12, 1911 |
| 2,723,132 | Oberwegner | Nov. 8, 1955 |
| 3,025,080 | Nelson | Mar. 13, 1962 |

FOREIGN PATENTS

| | | |
|---|---|---|
| 22,014 | Great Britain | of 1905 |